March 29, 1938.  J. O. LEWIS  2,112,441

FLOW AND PRESSURE INDICATOR

Filed March 9, 1936  2 Sheets-Sheet 1

Inventor;
John O Lewis,
per Arthur J. Farnsworth.
Attorney.

March 29, 1938. J. O. LEWIS 2,112,441
FLOW AND PRESSURE INDICATOR
Filed March 9, 1936 2 Sheets-Sheet 2
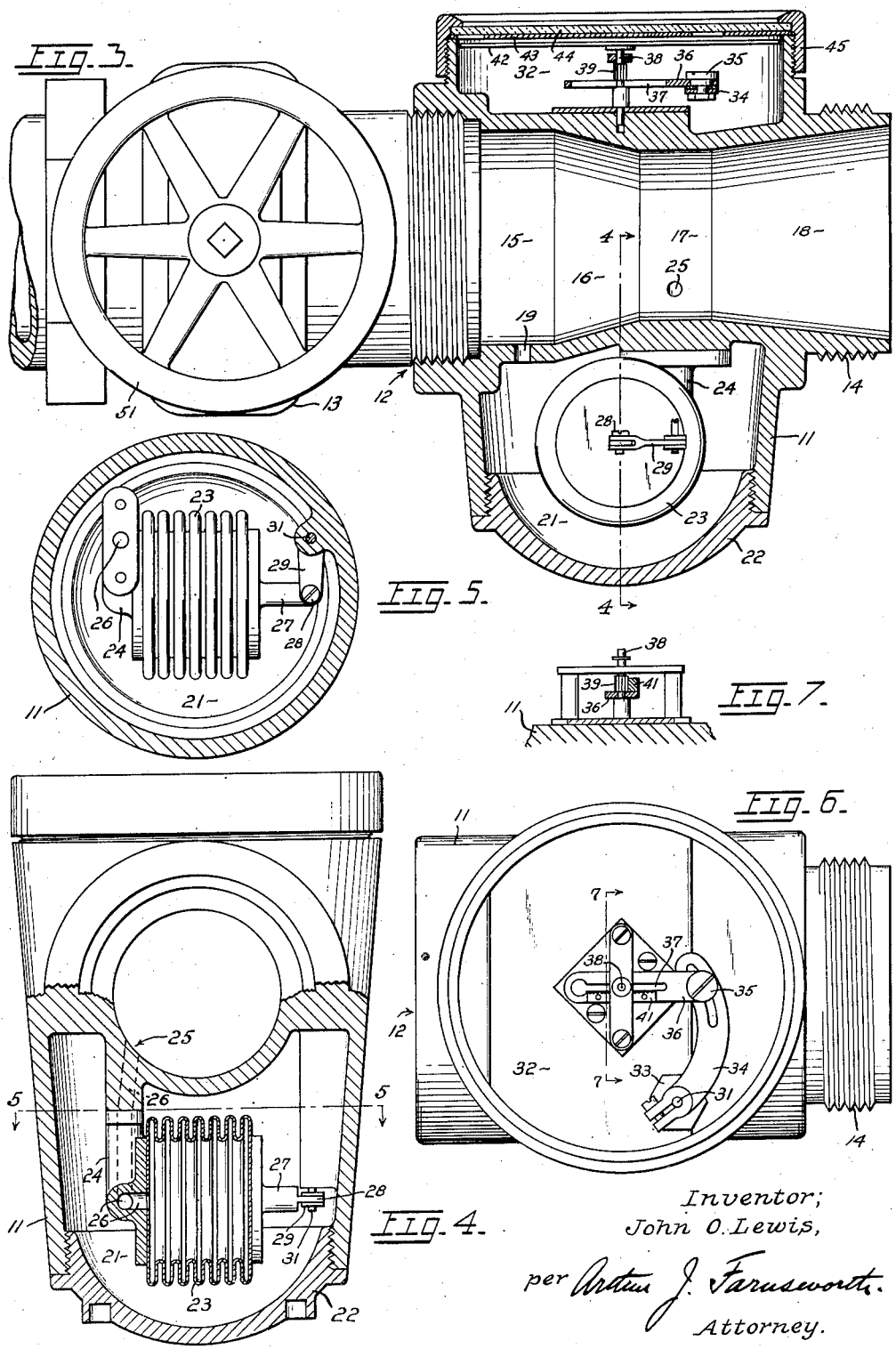
Inventor;
John O. Lewis,
per Arthur J. Farnsworth.
Attorney.

Patented Mar. 29, 1938

2,112,441

UNITED STATES PATENT OFFICE 2,112,441

FLOW AND PRESSURE INDICATOR

John O. Lewis, Pasadena, Calif., assignor to Morey & Jones, Ltd., Los Angeles, Calif., a corporation of California Application March 9, 1936, Serial No. 67,790

1 Claim. (Cl. 73—213)

In this specification, and the accompanying drawings, I shall describe and show a preferred form of my invention, and specifically mention certain of its more important objects. I do not limit myself to the form disclosed, since various changes and adaptations may be made therein without departing from the essence of my invention as hereinafter claimed.

My invention relates to hydraulic flow and pressure indicators, and particularly to compact self-contained instruments of this nature. Among the salient objects of the invention are; first, to provide a single instrument that is adapted to indicate both the rate at which liquid is discharged from, and the corresponding pressure at, a connected orifice or nozzle situated at varying distances from the instrument; second, to furnish a device of this kind, in which the indications of pressure at said orifice or nozzle will be true, irrespective of variations of elevation, and the amount of flow resistance between it and said device; third, to secure the aforesaid results in an instrument that is adapted for use where space is exceedingly limited; and, fourth, to accomplish the stated objects by means of a simple, dependable and comparatively inexpensive construction.

My objects are attained in the manner illustrated in the accompanying drawings, in which—

Figure 3 is an elevation of my instrument in central section, in cooperative relation to a supply line and controlling gate valve;

Figure 4 is an elevation of the instrument taken perpendicularly to its flow axis, shown partially in section taken on the line 4—4 of Fig. 3;

Figure 5 is a cross-section of the instrument in plan, taken on the line 5—5 of Fig. 4;

Figure 6 is a plan view of the instrument, similar to that shown in Fig. 1 but with the bezel and indicator disk removed; and, Figure 7 is a detail of the indicating mechanism in sectional elevation taken on the line 7—7 of Fig. 6.

Figure 2:
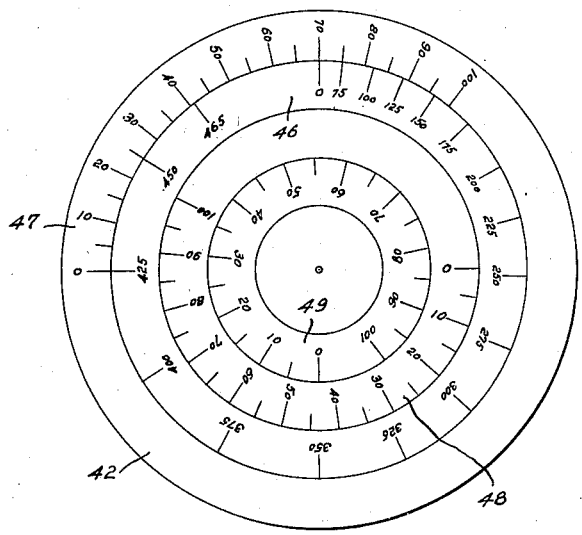
Figure 2 is a plan view of the indicating dial that is used in the instrument.
Figure 1:
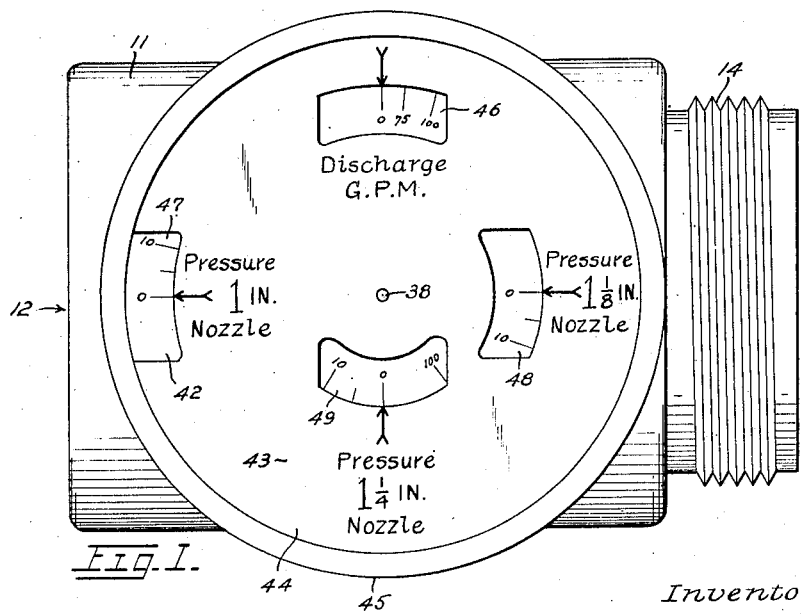
Figure 1 is a face view of my improved flow and pressure indicator, in plan.

Figs. 3-7 inclusive, are drawn to a smaller scale than Figs. 1 and 2. Similar reference numerals refer to similar parts throughout the several views.

Before proceeding to a detailed description of my invention, one of its principal applications will be discussed briefly, for the purpose of illustrating certain functional capacities that it possesses. This application relates to its use in connection with modern fire fighting equipment.

For extinguishing fires, the use of water discharged from a nozzle at the end of a hose, which in turn is coupled to a hydrant or fire engine, is almost universal. At the present time, fire engines are equipped with ordinary pressure gages which indicate only the pressure at the pump. In order to determine the pressure at a nozzle, and the rate of flow therefrom, calculations must be made. These calculations necessarily are based upon a number of variable and more or less indeterminate factors, including the length of the intervening hose line, the diameter of the hose, the nature and condition of the hose lining, the diameter of the nozzle, and the difference in elevation between the nozzle and the engine outlet. The last named factor, viz. difference of elevation, is subject to constant variations. The engineer of a fire engine, even if he is competent to do so, ordinarily has very little time to make calculations of this nature; and, moreover, such calculations would only be applicable while conditions remained constant, which they seldom do for long. The engineer should have means of knowing what conditions exist at the nozzle, through indications of an automatic instrument, to enable him at all times to make necessary adjustments at the engine.

It is well known that when the pressure of a fire stream falls below 25 lbs. at the nozzle, the stream will be comparatively ineffective. On the other hand, if the pressure at the nozzle is above 60 lbs., firemen have great difficulty in holding it; and, if the nozzle gets away from them, it is likely to cause serious injury. In view of these conditions, the present practice is to speed up the fire engine pump to deliver a discharge pressure of which the proper amount is arrived at by guessing, and then await word from the men at the nozzle, as to whether more or less pressure is required. Naturally this causes delay and confusion, since particular lines must be traced back to the engine, and the engineer then must guess again at the amount of additional pressure that is required.

The above stated conditions are complicated greatly when more than one fire line is attached to the engine, and often there are as many as four. These lines may be of different lengths, and their nozzles are almost certain to be at different elevations. Because the engineer has no present means for accurately regulating pressures at the different nozzles, one of the multiple lines may discharge so little water as to be almost useless, and another may have such a high pressure at the nozzle as to be very difficult to handle. Moreover, when more than one engine is pumping into a deluge set or water tower, there is no present means for indicating whether any particular engine is actually pumping water, or merely is maintaining pressure at the siamese connection. Under such conditions, I employ one of my indicators in each discharge line. These serve to indicate to the operator, the rates of flow in the lines at all times; and, when nozzles of known characteristics are in use, the operator also is kept constantly advised as to the pressures at each of these nozzles.

In the case of all hydraulic nozzles, the square of the volumetric flow rate is exactly proportional to the pressure which causes that flow. This pressure is that which exists in the supply pipe or hose, just up-stream from the nozzle convergence, referred to the elevation of the center of the discharge tip of the nozzle. Hence the volumetric flow rate is a measure of the hydraulic pressure at the base of the nozzle. This volumetric flow rate necessarily is the same as that existing at the moment in the supply pipe or hose.

The reaction force of streams issuing from fire nozzles, usually is about all that can be handled safely by firemen. This is particularly true in such precarious situations as on ladders. For example, if a 1¼" nozzle is being used, and the hydraulic pressure at the nozzle base is maintained at 50 lbs., the reaction, which firemen holding the nozzle must resist, is nearly 123 lbs. This shows the importance of having available, at all times, an accurate indication of the hydraulic pressure at each nozzle.

It will be noted that the described system for determining pressure at hydraulic nozzles, is entirely independent of changes in nozzle elevation, or of frictional resistance in the intervening pipe or hose connection. So long as the volumetric flow rate in the supply line is kept constant, the pressure at the nozzle will remain constant; and the nozzle pressure will be known if the size and character of the nozzle is known. My invention is based upon this principle of hydraulics.

In the use of my invention in a fire line at the engine, both pressure and discharge at the nozzle is continuously indicated. The engineer, therefore, is required to know only the diameter of the nozzle that is being used. Fire departments generally have standardized their nozzles, and also the nozzle pressures which will give effective streams while being within the capacity of firemen to handle. When a fire line is equipped with my invention, and the engineer knows these standard pressures and the size of the nozzle that is being used, it is easy to constantly maintain this pressure at the nozzle by merely adjusting the gate valve at the engine, irrespective of the elevation of the nozzle and the intervening frictional resistance.

In the form of my invention, that has been selected for illustration, the body portion or housing is indicated at 11. This is provided with a threaded socket 12, that is adapted to being screwed onto the male-threaded nipple of a gate valve 13, or similar fire engine outlet, in the manner indicated in Fig. 3. In axial alignment with socket 12, on the opposite side of the body, is an exteriorly threaded nipple 14, adapted for having a hose coupled thereto. Between socket 12 and nipple 14, and connecting them, there is a flow passage constituting a Venturi tube. The entrance portion of this tube is indicated at 15, the reducing section at 16, the throat at 17, and the expanding discharge portion at 18. This Venturi tube provides means for measuring the volumetric flow rate of the water that passes therethrough.

Pressure from the high-pressure side of the Venturi tube is communicated, through a small orifice 19 to chamber 21 at the bottom of the device. This chamber is made accessible, but is normally tightly closed, by means of a screwed spanner cap 22.

Within chamber 21, there is installed a metal bellows 23, one end of which is permanently attached to the body portion of the device, by means of the connector 24. Pressure from the throat of the Venturi tube is communicated to the interior of the bellows through orifice 25 and passage 26, the latter being partly indicated by dotted lines in Fig. 4. The bellows, mounted in the way described, is capable of acting in a manner analogous to that of a helical spring. Being subjected to pressure within and without, it can only respond to changes in differential pressure, that is, changes in the difference between the exterior and interior pressures. Equal increments in the differential pressure will cause equal changes in the length of the bellows. Movements of the free end of the bellows thus are capable of indicating the volumetric rate of flow through the Venturi tube. When the flow becomes greater, the bellows will contract, since the external pressure to which it is subjected, will become greater in proportion to the internal pressure. When the flow decreases, the reverse condition will apply, and the bellows will elongate.

The free end of the bellows is provided with a shackle stud 27, and the latter is pivotally connected at 28 to a lever arm 29, for operating the indicating mechanism. This lever arm in turn is attached to an upwardly extending torsion rod 31, extending into chamber 32 at the top of the instrument through a pressure bearing, of which the upper end is indicated by the hexagonal head 33. The length of torsion rod 31 is considerable, and it is of small diameter. Therefore, it is comparatively easy to pack it against leakage by means of labyrinth construction or otherwise, without producing objectionable frictional resistance to turning.

At the top of torsion rod 31, there is an adjustably attached arm 34, shown most clearly in Fig. 6. This arm is pivoted, through an adjustable screw and slot connection shown at 35, to a link 36, so that the latter is slidable in a horizontal plane. This link has a longitudinal slot 37, through which extends a vertical spindle 38. The spindle carries a small pinion 39, and the latter engages a rack 41 on link 36.

It is well known that difference in pressure between places of high and low velocity in a closed conduit, is proportional to the square of the volumetric rate of flow of liquids therethrough. When the flow through the Venturi tube increases, the pressure differential to which the bellows is subjected will also increase; and the bellows will contract proportionately to the change in pressure differential, and also proportionally to the square of the change in the volumetric rate of flow through the Venturi tube. The described mechanism therefore causes horizontal movements of link 36 to be proportional to movements of the bellows; and, consequently to be proportional to the square of changes in the volumetric rate of flow through the Venturi tube. The rack and pinion arrangement converts the motion of translation of link 36 into a proportional rotary motion of spindle 38, and the latter motion is also proportional to the square of changes in the volumetric rate of flow through the Venturi tube.

At the top of spindle 38, and mounted thereon, there is an indicating disk 42, upon the upper face of which there may be various graduated scales, as shown in Fig. 2. Above the scale disk there is a stationary mask 43; with appropriate openings therethrough for viewing portions of scales on the disk, as shown in Fig. 1, and there are arrows at the margins of these openings for indicating the respective scale readings. Above the mask is a cover glass 44, and the latter, and the mask, are retained in place by means of the bezel 45.

Referring to Figs. 1 and 2, graduated scale 46 indicates the rate of flow through the Venturi tube in gallons per minute, the graduations being made proportional to the square of the rate of flow. It is well known that pressure at a nozzle also varies proportionally to the square of the volumetric rate of flow, and this makes it possible to provide other graduated scales 47, 48 and 49, on disk 42, to indicate pressures at nozzles of known characteristics, having various diameters. Thus, for example, these scales may indicate the pressure at nozzles having diameters of 1 in., 1⅛ in., and 1¼ in., respectively.

When the described device is attached to a fire engine or other source of water under pressure, it will indicate directly the volumetric rate of flow therethrough at all times; and also the corresponding pressures at various sizes of nozzles through which this flow passes. This method of indicating nozzle pressures, being based entirely upon the volumetric rate of discharge from the nozzle, is absolutely independent of the elevation of the nozzle with respect to the instrument, and of frictional resistance in the intervening hose line. Therefore, if the engineer at a fire engine knows the size of a nozzle being used, he can maintain a substantially uniform pressure thereat, and also a uniform flow therefrom; merely by watching his instrument at the fire engine, and by manipulating hand-wheel 51 of gate valve 13 accordingly.

The adjustable connections at 31 and 35 (see Fig. 6) provide means whereby calibration of the instrument may be accomplished conveniently.

It is to be noted that my device is exceedingly compact, and thus it is adapted for use where there is very little space available for installation, as is the case of most fire fighting equipment. Its use is not limited to fire fighting installations however, and it will be found to be valuable for other commercial and utilitarian purposes.

Having thus fully described my invention, I claim:

In fire fighting equipment including pumping apparatus supplying liquid by a flexible hose line of variable length, resistance to flow, and elevation, to a nozzle from which the liquid is directed to the fire to be extinguished, the combination of a body having a Venturi passage therein, said body being positioned in the hose line in proximity to the pumping apparatus, means responsive to the pressures at the throat of said Venturi passage and at a point spaced from the throat of the Venturi passage and indicating mechanism actuated by said pressure responsive means, said indicating mechanism including a dial calibrated to indicate the pressure of the liquid at the nozzle regardless of variations in resistance to flow in the hose line, elevation of the nozzle, and length of the hose line, so that the operator at the pumping apparatus may know how the pumping apparatus should be regulated to maintain the nozzle pressure at the desired value merely by reading the dial of the indicating mechanism.

JOHN O. LEWIS.